May 16, 1961 A. PERROT 2,984,034
TRANSPARENCY SLIDE
Filed May 6, 1959

INVENTOR
Arnold Perrot
BY Edward V'Connor
ATTORNEY

United States Patent Office 2,984,034
Patented May 16, 1961

---

2,984,034

TRANSPARENCY SLIDE

Arnold Perrot, Martiweg 4, Nidau, near Bienne, Canton of Bern, Switzerland

Filed May 6, 1959, Ser. No. 811,460

Claims priority, application Switzerland Aug. 10, 1956

1 Claim. (Cl. 40—152)

This application is a continuation-in-part of my U.S. patent application Serial No. 673,678, filed July 23, 1957, now abandoned.

My invention relates to a transparency slide, and more particularly to a slide mounting for a pre-mounted transparency of the type wherein the transparency is marginally held between the two parts of a two-part frame, the two sides of the frame being alike.

There are various difficulties in holding a pre-mounted transparency in a slide mounting. As a matter of fact, if the transparency is loosely held between protective plates so that there is an appreciable air space between the transparency and the protective plates, the film transparency is not maintained in flat condition within a predetermined plane and any deviation of the transparency from such plane, as through buckling under the action of the heat emanating from projection apparatus, will result in distorted or out-of-focus images. If, on the other hand, a face-to-face contact relationship is assured between the protective plates and the transparency, the pressure exerted by the protective plates on the transparency will result in the formation of diffraction rings or so-called Newton rings, which impair the quality of the images projected on the screen.

The primary object of the invention is to remove these drawbacks by providing a transparency slide in which each protective plate includes a narrow projecting flange bearing on the periphery of the visible portion of the transparency and a marginal portion bearing on the one part of the said two-part frame, whereas a very thin air space is left between the transparency and the protective plates. Under these conditions, therefore, the transparency is free to move within predetermined limits between the protective plates, so that, on the one hand, the image projected on the screen is correctly focussed and, on the other hand, substantially no diffraction or Newton rings occur.

Another object of the invention is to provide a low-cost mounting of pre-mounted transparencies. In this respect labor is an important aspect of the total cost and any improvements are very important as they result in a cost saving.

Another object of the invention is to provide a transparency slide which may be readily assembled even by unskilled labor.

A further object of the invention is to provide a simple and ready means of enclosing a pre-mounted transparency in a slide mounting having transparent surfaces to protect the transparency and hold the transparency in a substantially flat condition.

Another object of the invention is to provide a transparency slide which is water-tight and dust-tight, so that the transparency is protected against moisture and dust penetration.

Another object of the invention is to provide a transparency slide which is symmetrical, that is to say, the thickness of its parts is equal on both sides of the transparency so that the surfaces of the slide are the same distance from the center line plane of the transparency.

Other objects and features will be apparent as the following description proceeds, reference being had to the accompanying drawing illustrating, by way of example, one preferred embodiment of my improved transparency slide. In this drawing.

Figure 4:
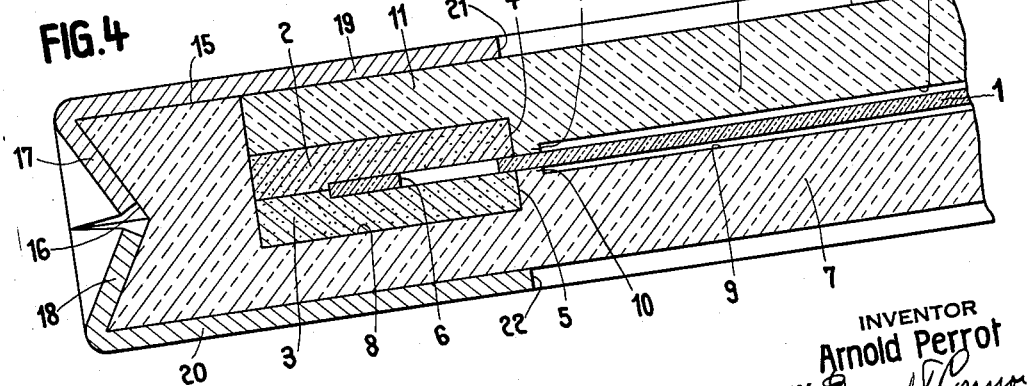
Fig. 4 is similar to Fig. 3, but shows only a portion of the slide, at a still larger scale.

Referring now to the drawing, the improved transparency slide is adapted to hold and to preserve a transparency or film 1 pre-mounted in a supporting frame formed of two sheets 2 and 3 each provided with a window 4 and 5, respectively, the sheets 2 and 3 being stuck together and enclosing the transparency 1. The sheets 2 and 3 are for instance made of cardboard. Thus, the transparency 1 is marginally held between the two parts 2 and 3 of the supporting frame, and the two sides of this frame are alike. The transparency 1 illustrated in Fig. 4 is provided with perforations 6, but the slide is also adapted to hold a transparency without such perforations.

The transparency slide has a first protective plate 7 made of a transparent material, for instance of a plastic material. The surface of the protective plate 7 is recessed as at 8 to receive the pre-mounted transparency, i.e. the supporting frame 2, 3 with the transparency 1. The protective plate 7 has in addition a central recess 9 the depth of which is smaller than the thickness of the sheet 3. A flange 10 is therefore formed between the recesses 8 and 9, the width of the flange 10 being also smaller than the thickness of the sheet 3. Therefore, the transparency 1 is in contact with the protective plate 7 only in a narrow marginal portion, as clearly shown in Fig. 4.

A second protective plate 11, also made of a transparent material and preferably of the same material as the protective plate 7, is received in the recess 8. The protective plate 11 has a raised portion 12 of its inner surface exactly engaging the window 4 of the sheet 2. The raised portion 12 has a marginal flange 13 at its periphery, similar to the flange 10 of the protective plate 7. Thus, a central recess 23 is formed in the plate 11, which lies opposite the recess 9 of the plate 7. The height and the width of the flange 13 are both a fraction of the thickness of the sheet 2 or 3 of the supporting frame. Thus, the transparency 1 is in contact with the protective plate 11 only in a narrow marginal portion (Fig. 4).

The thickness of the several parts is such that the top face 14 of the second protective plate 11 is flush with the top face 15 of the first protective plate 7. In addition, the second protective plate 11 is of approximately the same size as the outer edges of the pre-mounted transparency.

Figure 1:
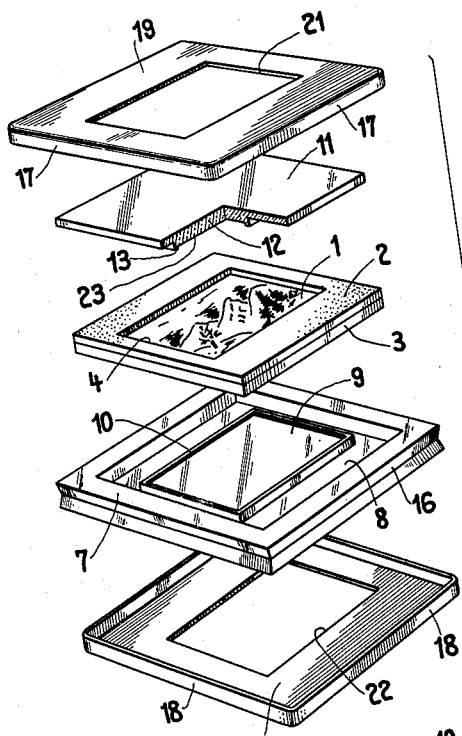
Fig. 1 is a perspective exploded view of the slide.
Figure 2:
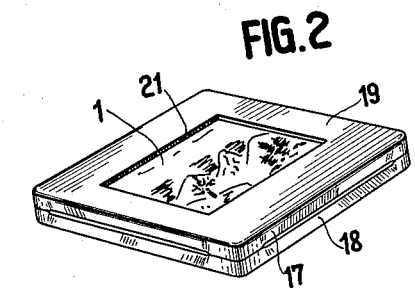
Fig. 2 is a perspective view of the transparency slide when assembled and sealed.
Figure 3:
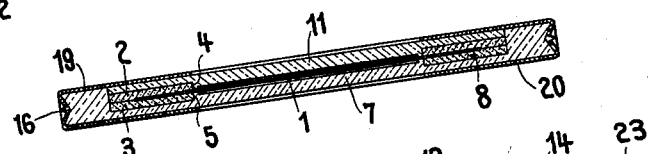
Fig. 3 is a cross-sectional view of the slide shown in Fig. 2, at an enlarged scale.

The outer edges of the first protective plate 7 present a groove 16 having a V-shaped section against the walls of which may be bent the flanges 17 and 18 of two metallic tray-shaped metal masks 19 and 20, respectively, provided with rectangular windows 21 and 22, respectively. The thickness of the masks 19 and 20 is very small with respect to the thickness of the protective plate 7. For fixing the masks 19 and 20 onto the plate 7, the apparatus described in my U.S. Patent No. 2,870,815 is preferably used. Figs. 2 to 4 illustrate the bent position of the flanges of the masks 19 and 20. The second protective plate 11 is thus held in position in the recess 8 of the first protective plate 7 by the metal mask 19.

When the transparency slide is brought onto the market and sold, the mask 20 is already secured to the first protective plate 7, so that for assembling and sealing the slide, it is sufficient to insert into the recess 8 of the plate 7 the supporting frame 2, 3 provided with the transparency 1, to put in place the second protective plate 11 and to fix the mask 19, the whole operation being quickly performed even by the unskilled labor. If the transparency 1 of an already sealed slide is to be replaced, it suffices to tear out the mask 19 by raising its flanges 17 and to fix a new mask onto the plate 7. For this purpose spare masks are preferably sold with the complete slides.

As shown in Fig. 2, the flanges of the masks 19 and 20 are not bent up to their ends, i.e. they remain upright at the corners of the slide. Therefore, a substantial reinforcement of the slide is obtained and these corners remain clean, as no accumulated material projects beyond the dimensions of the slide.

The masks 19 and 20, as already said, are very thin, but prevent the protective plates 7 and 11 from being scratched when the slides are inserted into projecting apparatus.

Due to the provision of the two protective plates 7 and 11, it is practically impossible for dust and moisture to penetrate within the slide and to impair the transparency 1.

The described transparency slide is inexpensive, easy to handle and does not include breakable parts such as the protective glasses used up to now.

In addition, the transparency 1 is tightly pressed over a narrow edge portion between the projecting flanges 10 and 13 of the protective plates 7 and 11, respectively, so that its position is exactly determined with respect to the outer faces of the slide. Moreover, the supporting frame consisting of the sheets 2 and 3 is also supported by the plates 7 and 11, so that it is firmly secured within the slide. The transparency 1, while firmly held over its periphery between the flanges 10 and 13, is free in its central portion as clearly shown in Fig. 4. Therefore, a small clearance is left between the transparency 1 and the inner faces of the plates 7 and 11 and no pressure is exerted on the central portion of the transparency 1, i.e. over substantially the whole area thereof, which results in avoiding the formation of diffraction rings or fringes. However, the thickness of the said clearance is less than 0.5 millimeter, so that the displacement allowed for the transparency 1 cannot impair the sharpness of the image projected onto the screen. One might say that in the slide according to the invention, the transparency 1 is allowed to "respire," although its position is well determined in the slide.

In a previous known construction, the transparency is also held with a small play between two protective plates, but no flanges such as the flanges 10 and 13 of the present invention are provided, the protective plates only pressing the supporting frame made of two sheets of cardboard. As is well-known, cardboard is a spongy material the thickness of which is altered to a great extent when it is subjected to an increasing pressure. Moreover, the supporting frames enclosing the transparencies which are delivered by the business houses which process the films generally do not have a constant thickness, due to the method of manufacturing cardboard. For these reasons, if only the supporting member of cardboard is pressed between the protective plates, the position of the transparency is not exactly determined. On the contrary, in accordance with the main feature of the present invention, there are provided two bearing or supporting surfaces for the pre-mounted transparency, viz. on the one hand, the sheet 2 or 3 respectively is pressed by the protective plate 7 or 11, and, on the other hand, the transparency 1 itself is pressed over its narrow edge portion between the flanges 10 and 13 of the said protective plates. Due to this double bearing surface, the transparency is perfectly held in the slide, yet does not give rise to the production of diffraction figures. Of course, so-called anti-Newton masks which are generally to be used in the known transparency slides may be dispensed with in the present invention.

It has also been observed, in prior known constructions in which a face-to-face contact relationship is assured between the transparency and the protective plates, that often the transparency adheres or sticks to one of the protective plates after some months, which results in damaging the transparency, due to the fact that the photographic emulsion of the film transparency was not quite dry at the moment of sealing the slide. Such a drawback is avoided with the novel transparency slide in accordance with the invention.

It will finally be noted that the transparency slide illustrated is symmetrical, i.e. the thickness of its parts is equal on both sides of the transparency, so that the surfaces of the slide are the same distance from the center line plane of the transparency.

While I have described and illustrated one embodiment of my invention, I do not wish to unnecessarily limit the scope thereof, but reserve the right to make such modifications and rearrangements of the several parts as may come within the purview of the accompanying claim.

What I claim is:

In a slide mounting for a pre-mounted transparency, the slide mounting including a pair of transparent plates having cooperating recesses on facing surfaces to receive the pre-mounted transparency, and a pair of windowed masks about the transparent plates when same are in position about the transparency, the edges of one of the transparent plates grooved, the edges of the masks turned in to the groove along only a part of the length thereof, the edges of the masks being turned in abutting relationship at the corners of the slide mounting, the transparent plates having flanges extending from their facing surfaces and positioned to contact the edges of the transparency on both sides thereof about the periphery thereof, the facing surfaces of the plates inwardly of the flanges being spaced from the transparency.

References Cited in the file of this patent

UNITED STATES PATENTS

| 2,490,058 | Jablon | Dec. 6, 1949 |
| 2,527,765 | Roehrl | Oct. 31, 1950 |

FOREIGN PATENTS

| 272,287 | Switzerland | Mar. 1, 1951 |